(12) United States Patent
Lin et al.

(10) Patent No.: US 11,484,159 B2
(45) Date of Patent: Nov. 1, 2022

(54) FOLDABLE SCREEN AND SHOWER ROOM

(71) Applicant: FUJIAN XIHE SANITARY WARE TECHNOLOGY CO., LTD., Nan'An (CN)

(72) Inventors: Xiaofa Lin, Nan'An (CN); Xiaoshan Lin, Nan'An (CN); Pengxing Zheng, Nan'An (CN); Youchang Shen, Nan'An (CN); Xiaoqing Deng, Nan'An (CN)

(73) Assignee: FUJIAN XIHE SANITARY WARE TECHNOLOGY CO., LTD, Fujian (CN)

( * ) Notice: Subject to any disclaimer, the term of this patent is extended or adjusted under 35 U.S.C. 154(b) by 0 days.

(21) Appl. No.: 16/625,425

(22) PCT Filed: May 31, 2019

(86) PCT No.: PCT/CN2019/089560
§ 371 (c)(1),
(2) Date: Dec. 20, 2019

(87) PCT Pub. No.: WO2020/168653
PCT Pub. Date: Aug. 27, 2020

(65) Prior Publication Data
US 2021/0369057 A1    Dec. 2, 2021

(30) Foreign Application Priority Data

Feb. 21, 2019 (CN) .......................... 201910130695.8
Feb. 21, 2019 (CN) .......................... 201920229602.2

(51) Int. Cl.
*A47K 3/36* (2006.01)
*E05D 11/00* (2006.01)
(Continued)

(52) U.S. Cl.
CPC ............ *A47K 3/36* (2013.01); *E05D 11/0054* (2013.01); *F16H 1/06* (2013.01); *F16H 57/02* (2013.01); *E05Y 2900/114* (2013.01)

(58) Field of Classification Search
CPC ...... F16H 1/06; F16H 57/02; E05Y 2900/114; E05Y 2201/11; E05Y 2800/12; E05D 11/0054; E05D 7/081; A47K 2003/305
See application file for complete search history.

(56) References Cited

U.S. PATENT DOCUMENTS

2004/0034968 A1* 2/2004 Williams ................ E05F 3/102
                                                        16/354
2004/0083576 A1* 5/2004 Reppert ................. E05D 7/081
                                                        16/243
(Continued)

FOREIGN PATENT DOCUMENTS

CN    201705134 U    1/2011
CN    203169035 U    9/2013
(Continued)

OTHER PUBLICATIONS

International Search Report, International Patent Application PCT/CN2019/089560, dated Oct. 14, 2019 (3 pages).
(Continued)

*Primary Examiner* — William C Joyce
*Assistant Examiner* — Gregory T Prather
(74) *Attorney, Agent, or Firm* — Brooks Kushman P.C.

(57) ABSTRACT

A foldable screen and a shower room are provided. The foldable screen includes a transmission gear mechanism and a plurality of panel bodies arranged in sequence. End portions of two adjacent sides of two adjacent panel bodies enclose to form a mounting opening into which the transmission gear mechanism is installed for realizing folding and unfolding of the plurality of panel bodies. The transmission gear mechanism includes a housing having a receiv- (Continued)

ing cavity therein, the housing being installed in the mounting opening; a first gear located in the receiving cavity and installed on one of the two adjacent panel bodies; and a second gear meshed with the first gear, the second gear being located in the receiving cavity and installed on the other of the two adjacent panel bodies.

16 Claims, 11 Drawing Sheets

(51) Int. Cl.
  *F16H 1/06* (2006.01)
  *F16H 57/02* (2012.01)

(56) References Cited

U.S. PATENT DOCUMENTS

| | | | |
|---|---|---|---|
| 2010/0024169 A1* | 2/2010 | Self | E05D 3/122 |
| | | | 16/354 |
| 2018/0142507 A1* | 5/2018 | Murphy | E05F 5/08 |

FOREIGN PATENT DOCUMENTS

| | | |
|---|---|---|
| CN | 205935762 U | 2/2017 |
| CN | 208220457 U | 12/2018 |
| CN | 208347577 U | 1/2019 |
| CN | 109730563 A | 5/2019 |
| DE | 29607376 U1 | 7/1996 |
| JP | 2009270262 A | 11/2009 |
| RU | 2107798 C1 | 3/1998 |

OTHER PUBLICATIONS

European Patent Office Search Report, European Patent Application No. 19794406.9, dated Jul. 9, 2020 (9 pages).

Russian Federal Service for Intellectual Property Search Report & Office Action, Russian Patent Application No. 2019139083/03, dated Oct. 5, 2020 (10 pages).

* cited by examiner

FOLDABLE SCREEN AND SHOWER ROOM

CROSS-REFERENCE TO RELATED APPLICATIONS

This application is a U.S. national phase of PCT/CN2019/089560 filed May 31, 2019, which claims priority to Chinese patent application No. 201910130695.8 filed Feb. 21, 2019, and Chinese patent application No. 201920229602.2 filed Feb. 21, 2019, which are hereby incorporated by reference herein in their entireties.

TECHNICAL FIELD

The present disclosure relates to, but is not limited to, the technical field of kitchen and bathroom equipment, in particular to a foldable screen and a shower room.

BACKGROUND

The current foldable door for bathtub includes a plurality of door panels which are sequentially arranged, and two adjacent door panels are drivingly coupled through a meshing gear structure, so as to realize folding and unfolding of the foldable door. However, there is a rotation gap between the meshed teeth of the meshing gear structure, therefore a seal cannot be formed therebetween, and water will reach the outside of the foldable door through the gap.

SUMMARY

The following is an overview of the subject matters described in detail in this disclosure. This summary is not intended to limit the protection scope of the claims.

This disclosure provides a foldable screen including a transmission gear mechanism and a plurality of panel bodies arranged in sequence. End portions of two adjacent sides of two adjacent panel bodies enclose to form a mounting opening into which the transmission gear mechanism is installed for realizing folding and unfolding of the plurality of panel bodies. The transmission gear mechanism includes: a housing having a receiving cavity therein, the housing being installed in the mounting opening; a first gear located in the receiving cavity and installed on one of the two adjacent panel bodies; and a second gear meshed with the first gear, the second gear being located in the receiving cavity and installed on the other of the two adjacent panel bodies.

This disclosure also provides a shower room including a foldable screen as described above.

This disclosure also provides a transmission gear mechanism for realizing folding and unfolding of two adjacent panel bodies. The end portions of two adjacent sides of the two adjacent panel bodies enclose to form a mounting opening into which the transmission gear mechanism is installed. The transmission gear mechanism includes: a housing having a receiving cavity therein, the housing being installed in the mounting opening; a first gear located in the receiving cavity and installed on one of the two adjacent panel bodies; and a second gear meshed with the first gear, the second gear being located in the receiving cavity and installed on the other of the two adjacent panel bodies.

Additional features and advantages of the disclosure will be set forth in the description which follows, and in part will be obvious from the description, or may be learned by practice of the disclosure. The objects and other advantages of the present disclosure can be realized and attained by the structures particularly described in the specification, claims and drawings.

Other aspects will become apparent upon reading and understanding the drawings and detailed description.

BRIEF DESCRIPTION OF THE DRAWINGS

The drawings described herein are used to provide a further understanding of the disclosure and form a part of the disclosure. The illustrative embodiments of the disclosure and the description thereof are used to explain the disclosure and do not improperly limit the disclosure.

The accompanying drawings are used to provide a further understanding of the technical schemes of the present disclosure and form a part of the specification. The drawings together with the embodiments of the present disclosure are used to explain the technical schemes of the present disclosure and do not limit the technical schemes of the present disclosure.

Figure 1:
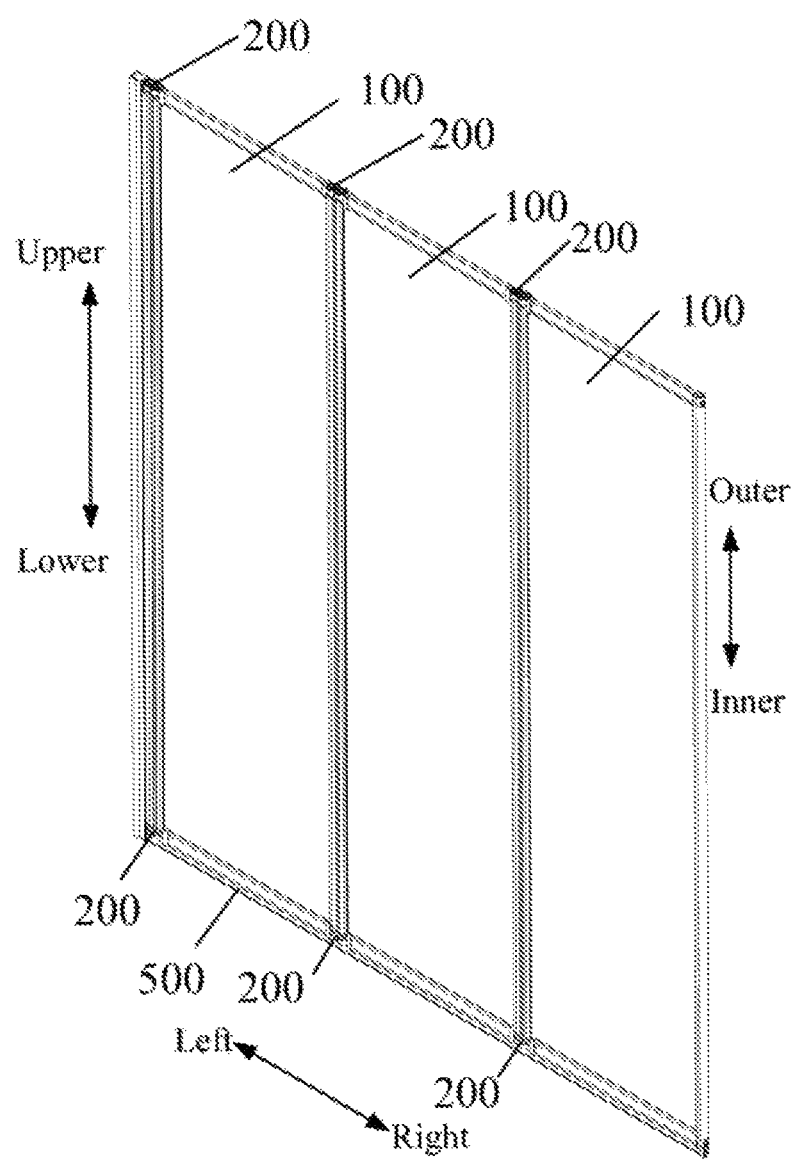
FIG. 1 is a schematic perspective structural view of a foldable screen according to an embodiment of the present disclosure.

The correspondences between reference numerals and component names in FIGS. 1 to 11 are as follows:

100 panel body, 101 mounting opening, 102 frame, 103 notch, 104 baffle, 105 vertical frame part, 106 horizontal frame part, 107 connector, 108 supporting member, 200 transmission gear mechanism, 201 housing, 202 first gear, 203 second gear, 204 guiding portion, 205 water storage groove, 206 water outlet, 300 first seal, 400 third seal, 500 second seal, 600 connecting beam, 700 fixing beam, 800 retaining component, 901 water stop rib, 902 water stop groove.

DETAILED DESCRIPTION

Hereinafter, embodiments of the present disclosure will be described in detail with reference to the accompanying drawings. It should be noted that the embodiments in the present disclosure and the features in the embodiments can be combined with each other arbitrarily if there is no conflict.

In the following description, numerous specific details are set forth in order to facilitate a full understanding of the present disclosure. However, the present disclosure may be implemented in other ways than those described herein.

Therefore, the protection scope of the present disclosure is not limited by the specific embodiments disclosed below.

As shown in FIGS. 1, 2, 8 to 10, the foldable screen provided by the present disclosure includes a plurality of transmission gear mechanisms 200 and a plurality of panel bodies 100 which are arranged in sequence. The upper and lower end portions of adjacent sides of two adjacent panel bodies 100 enclose to form the mounting openings 101, and each of the plurality of transmission gear mechanisms 200 is mounted in the corresponding one of the plurality of mounting openings 101 for realizing folding and unfolding of the plurality of panel bodies 100. The transmission gear mechanism 200 includes a housing 201 having a receiving cavity therein, which is installed in the mounting opening 101, so that the panel body 100 and the housing 201 can rotate relative to each other; a first gear 202 located in the receiving cavity of the housing 201 and mounted on one of the two adjacent panel bodies 100 by a screw; and a second gear 203 meshed with the first gear 202, wherein the second gear 203 is positioned in the receiving cavity of the housing 201 and can be mounted on the other of the two adjacent panel bodies 100 by a screw, so that the panel body 100 can rotate relative to the housing 201.

The foldable screen with the meshed first and second goal's 202 and 203 both positioned in the housing 201 solves the problem that the sealing cannot be realized due to the meshing of the first gear 202 and the second gear 203. A sealing can be realized between the housing 201 and the panel bodies 100. The mounting opening 101 can be sealed through the cooperation between the spherical housing 201 and the concave spherical vertical edge of the matching connector 107 (described later), so that water is prevented from leaking from the bathroom to the outside of the bathroom at the transmission gear mechanism 200 when the foldable screen is applied to the shower room, meanwhile the foldable screen still has the functions of folding and unfolding.

Of course, it is also possible that the mounting opening 101 is only located at the lower end or the upper end, and the screws can be replaced by structural members, such as pins, which will not be described in detail herein.

It should be noted that in the present disclosure, the inner end of the housing 201 refers to the end of the housing 201 facing the panel body 100, whereas the outer end of the housing 201 refers to the end of the housing 201 facing outward, i.e., the end facing aw ay from the panel body 100.

Figure 9:
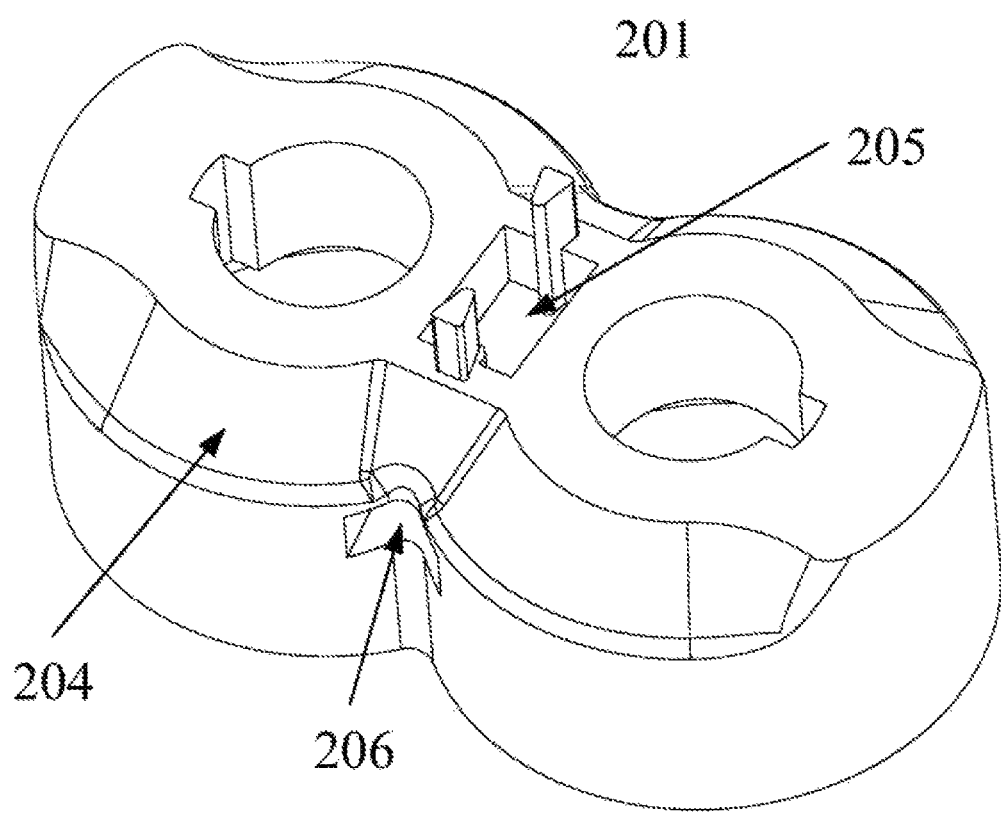
FIG. 9 is a schematic perspective structural view of an embodiment of the housing in FIG. 8.
Figure 10:
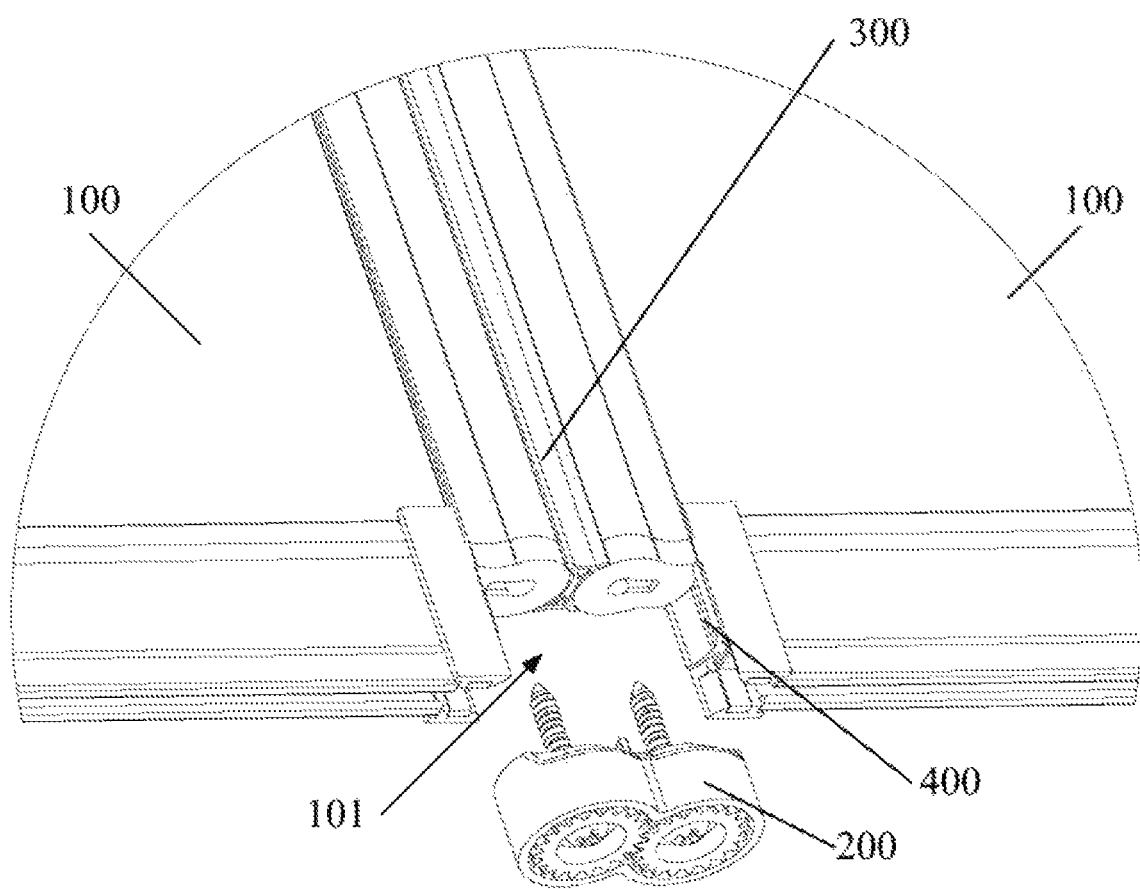
FIG. 10 is a schematic perspective partial structural view of the transmission gear mechanism in FIG. 1 assembled with two adjacent panel bodies.

As shown in FIG. 9, the transmission gear mechanism 200 arranged at the lower end of the screen is provided with a guiding portion 204 on the outer side surface of the inner end of the housing 201. The guiding portion 204 can be a guiding slope and can guide the water to flow-downward quickly.

Furthermore, as shown in FIG. 9, the outer top surface of the inner end of the housing 201 is provided with a water storage groove 205, and the outer side surface of the housing 201 is provided with a water outlet 206 which is communicated with the water storage groove 205 through a channel. The water outlet 206 can be arranged to face the bathtub when applied to the shower room, so that the water flowing into and accumulated in the water storage groove 205 flows toward the bathtub through the water outlet 206, preventing water from flowing to the side facing away from the bathtub, and thus preventing water from overflowing from the bathroom unrestrictedly during bathing.

Figure 11:
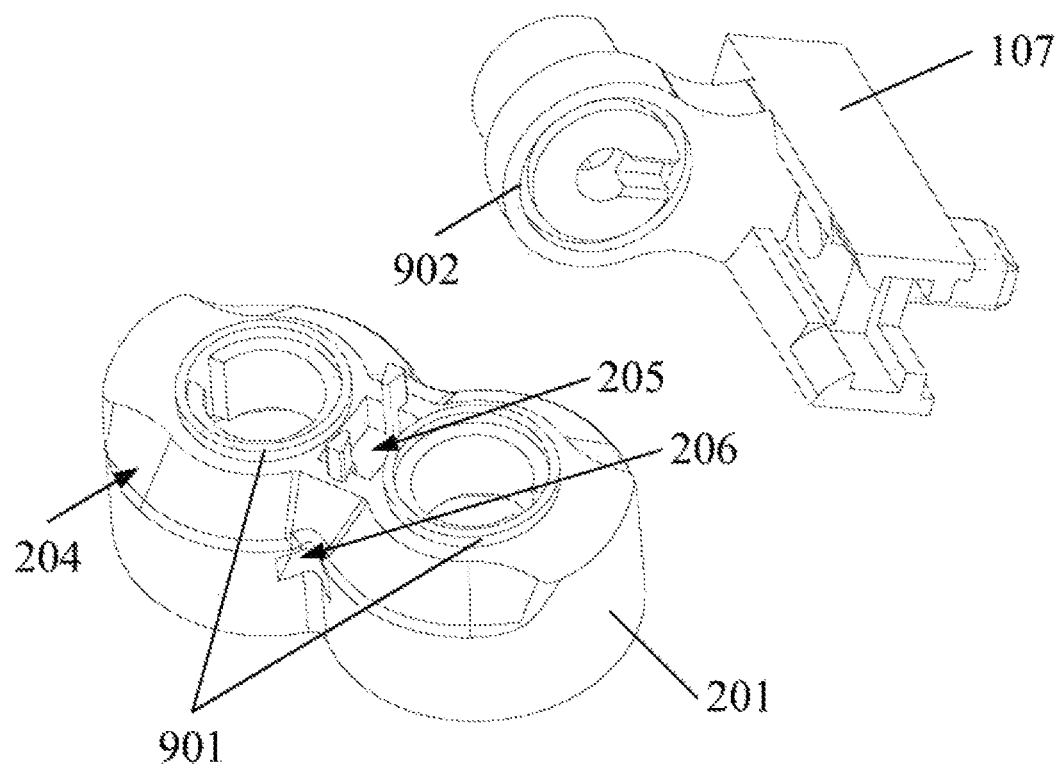
FIG. 11 is a schematic exploded structural view of another embodiment of the housing find the connector in FIG. 1.

Furthermore, as shown in FIG. 11, one of the end face of the inner end of the housing 201 and the top wall of the mounting opening 101 is provided with an annular water stop rib 901, and the other is provided with an annular water stop groove 902 into which the water stop rib 901 is inserted. It is possible that the end face of the inner end of the housing 201 is provided with the water stop rib 901, and the top wall of the mounting opening is provided with the water stop groove 902 (see FIG. 11). It is also possible that the end face of the inner end of the housing 201 is provided with the water stop groove 902, and the top wall of the mounting opening is provided with the water stop rib 901 (this scheme is not shown in figures). Both arrangements can achieve the object of the present disclosure. Specifically, the end face of the inner end of each housing 201 is provided with two through holes at intervals for two screws to pass through. Two sets of water stop ribs 901 and water stop grooves 902 are arranged at intervals in one set of housing 201 and the mounting opening 101. Each of the two sets of water stop ribs 901 and water stop grooves 902 are arranged around one of the two through holes. The water stop rib 901 and water stop groove 902 fitted to each other can block and prevent water from reaching the through hole and entering the housing 201 through the through hole.

In an exemplary embodiment, the housing 201 is a closed housing (e.g., formed of separate parts) or an open-ended housing, etc., both of which can achieve the purpose of the present disclosure and do not depart from the design concept of the present disclosure, and thus fall within the protection scope of the present disclosure. No more details will be repeated herein.

In an exemplary embodiment, as shown in FIGS. 1-3, 4, 6 and 10, the foldable screen further includes a first seal 300 disposed between two adjacent panel bodies 100; a third seal 400 disposed between the housing 201 and the wall of the mounting opening 101, particularly disposed between the housing 201 and the vertical edge of the connector 107 described below; and a second seal 500 disposed on the lower end faces of the plurality of panel bodies 100 along the folding and unfolding directions of the foldable screen, the outer end of the housing 201 abuts on the second seal 500. The first and second seals 300 and 500 may be sealing strips. The third seal 400 may be a plurality of sealing sheets or a sealing ring.

Figure 3:
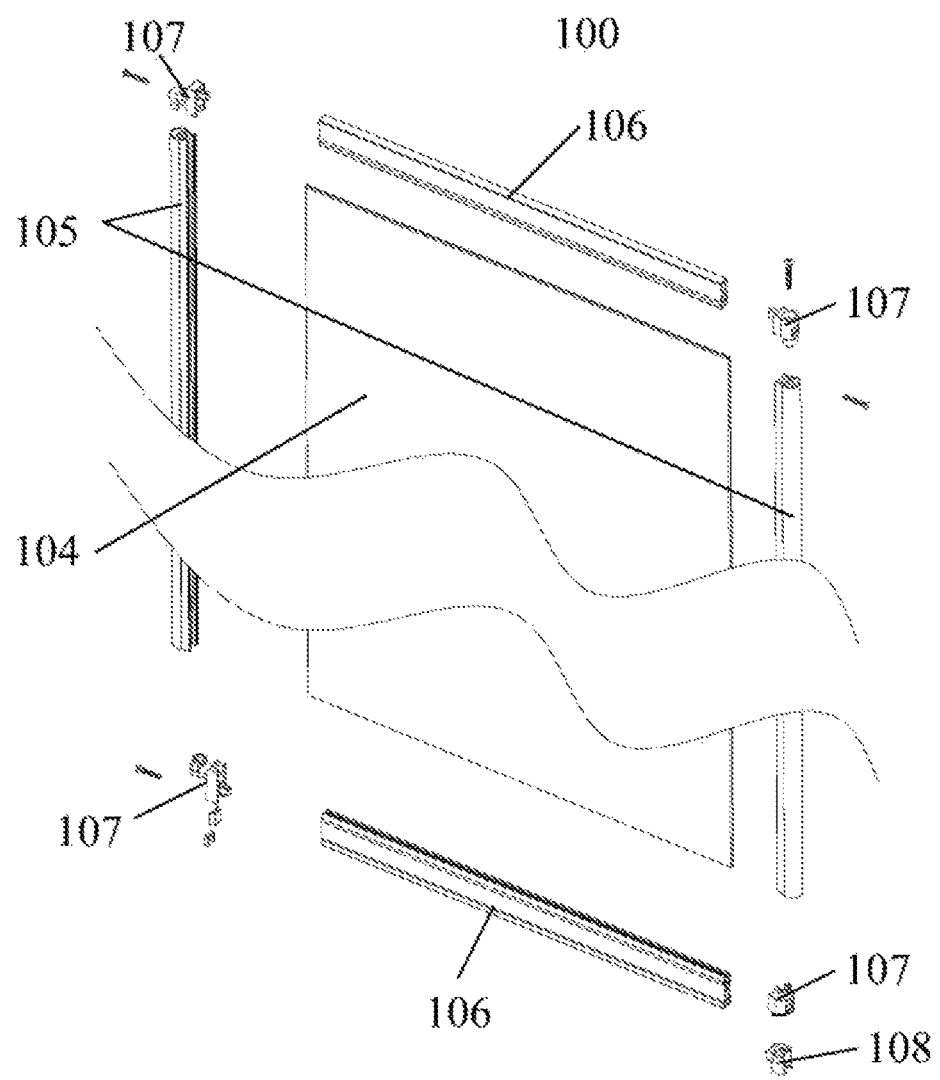
FIG. 3 is a schematic partial exploded structural view of the last panel body in FIG. 1.
Figure 4:
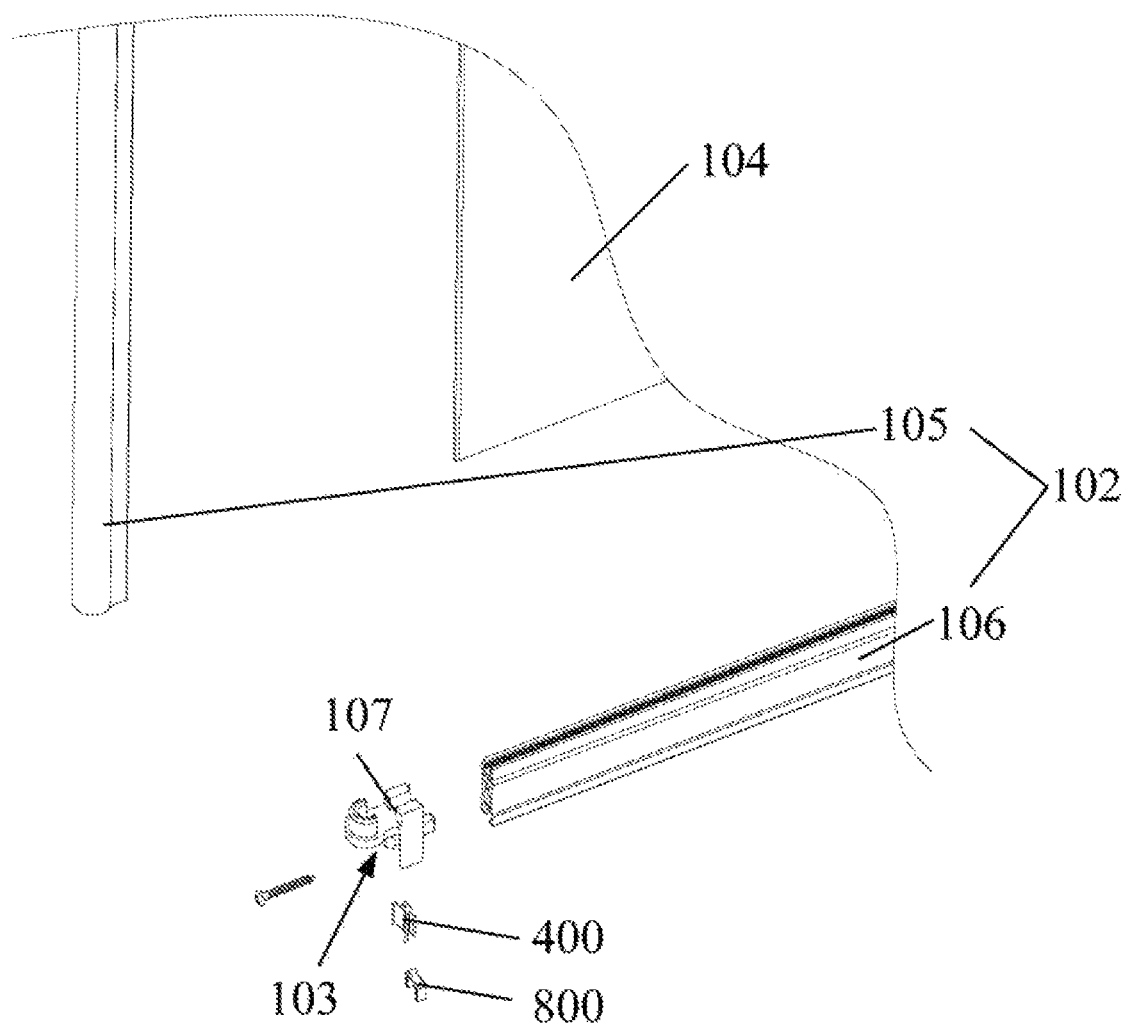
FIG. 4 is a schematic partial structural view of FIG. 3.
Figure 5:
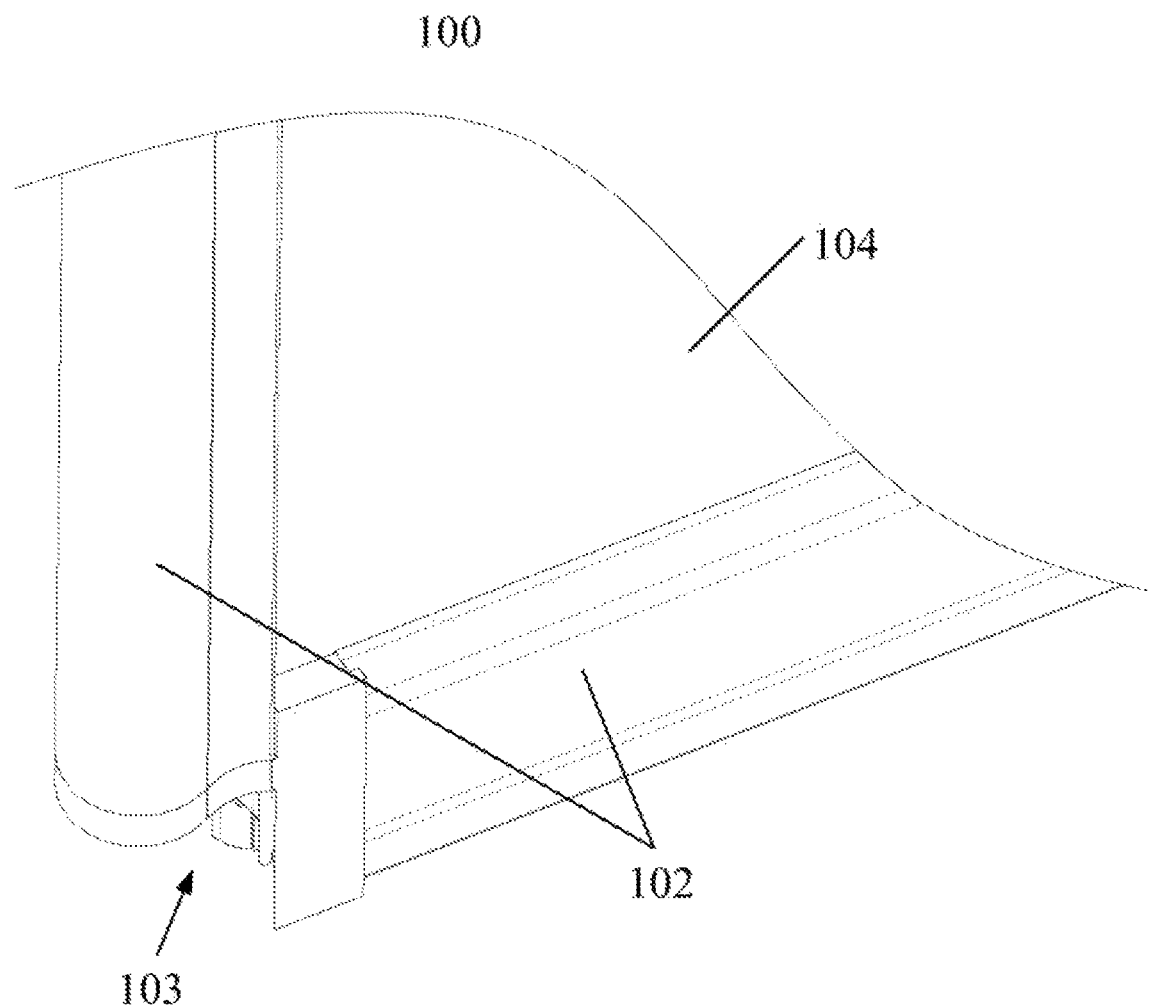
FIG. 5 is a schematic structural view of FIG. 4 after assembly.
Figure 6:
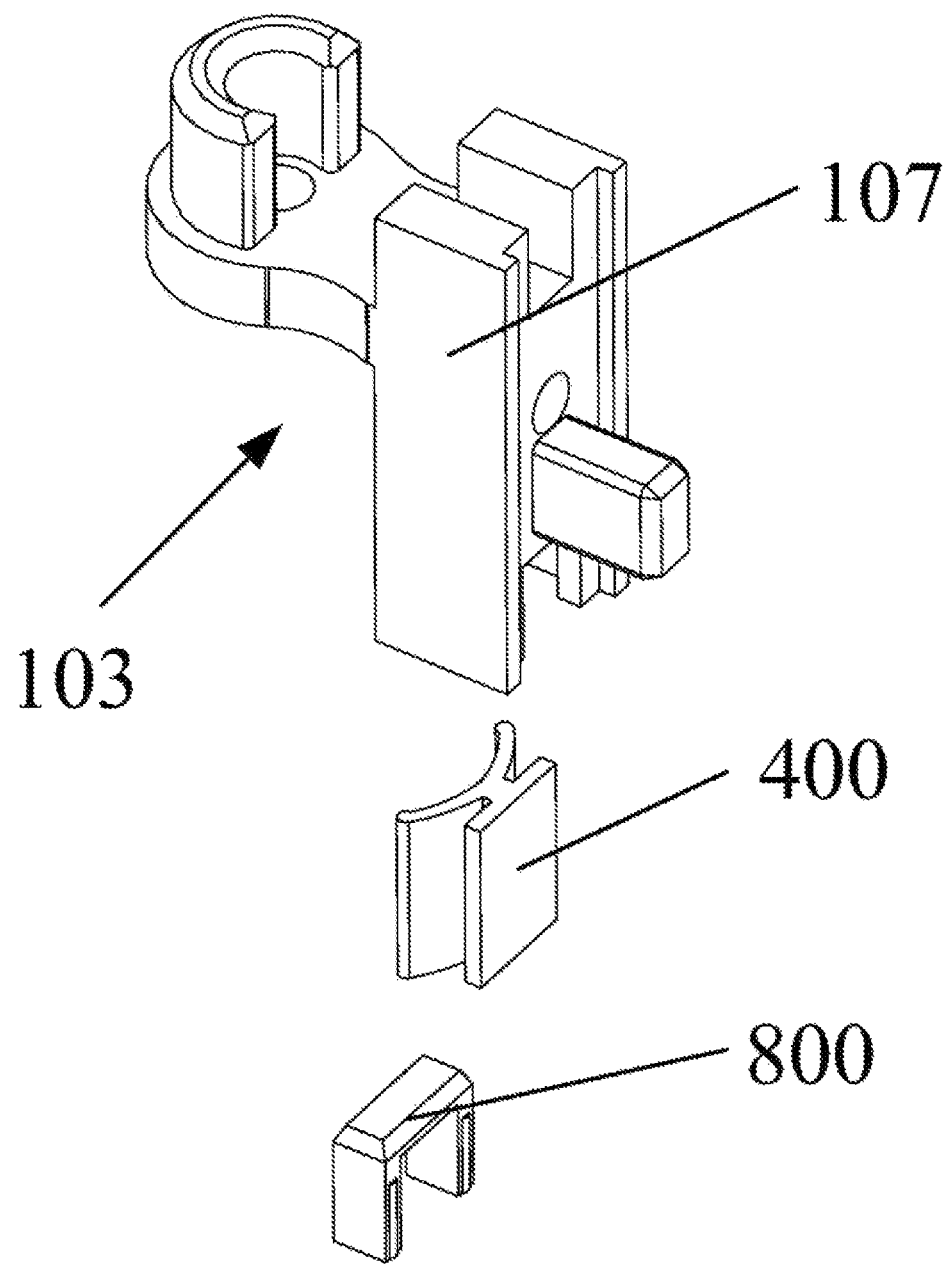
FIG. 6 is a schematic exploded structural view of the connector, the third seal and the retaining component in FIG. 5.

In an exemplary embodiment, as show n in FIGS. 3 to 5, the panel body 100 includes a frame 102 and a baffle 104 installed within the frame 102. The frame 102 is provided with four notches 103 at the outer frame corners thereof, and the opposite four notches 103 of two adjacent frames 102 face each other to form two mounting openings 101. The baffle 104 may be a plastic plate or a glass plate, and the frame 102 may be a plastic frame or an aluminum alloy frame, etc., all of which can achieve the purpose of the present disclosure and do not depart from the design concept of the present disclosure, and thus fall within the protection scope of the present disclosure. No more details will be repeated herein.

Figure 2:
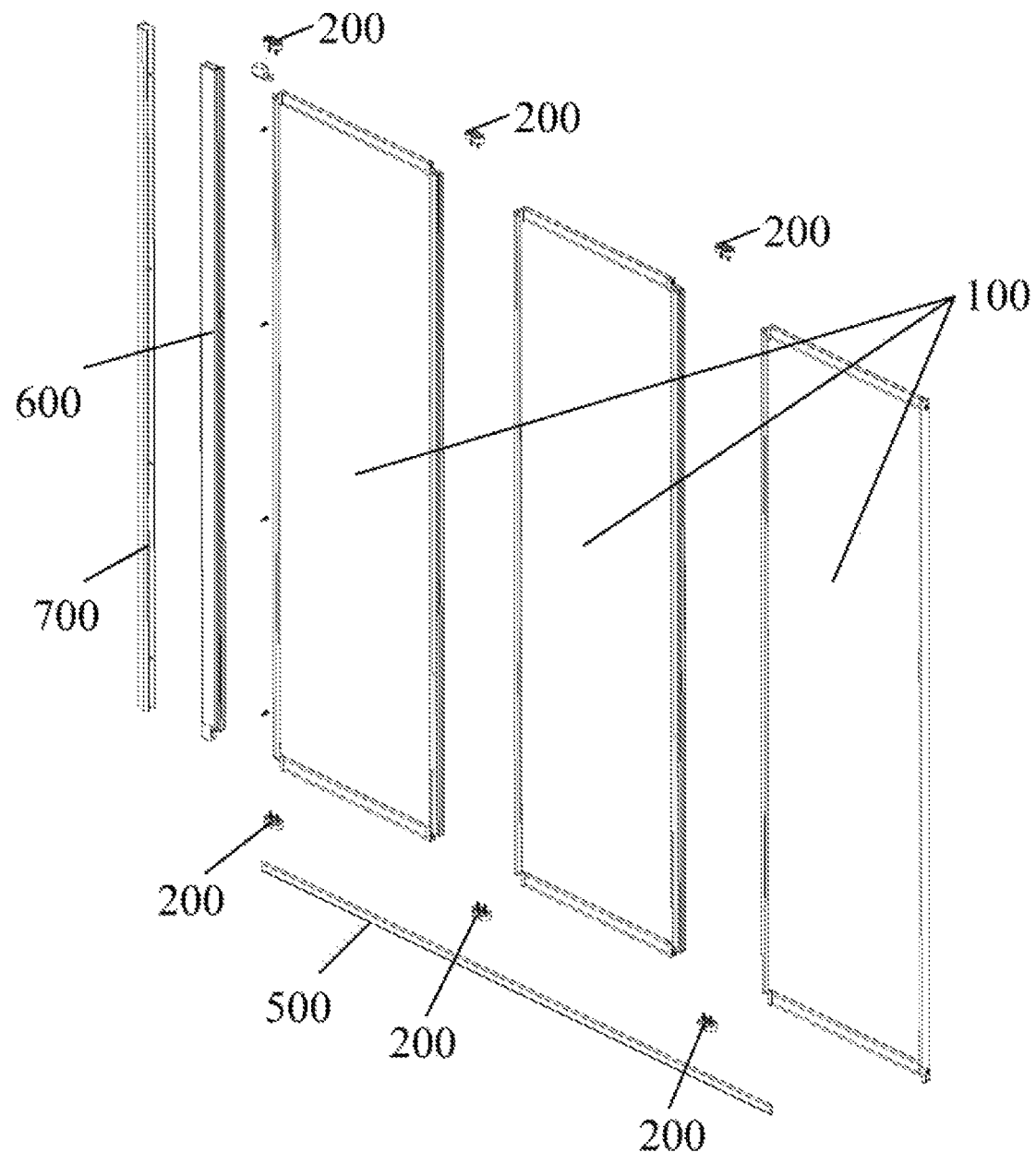
FIG. 2 is a schematic exploded structural view of the foldable screen shown in FIG. 1.

Specifically, as shown in FIGS. 2 to 7, the frame 102 includes two vertical frame parts 105, two horizontal frame parts 106, and four connectors 107 connecting the two vertical frame parts 105 and the two horizontal frame parts 106 together. As shown in FIG. 2, the connectors may have a bended shape or L-shape, in which case the horizontal edges of the connectors 107 can be connected to the vertical frame parts 105 by screws, the vertical edges of the connectors 107 can be connected to the horizontal frame parts 106 by screws, and the notches 103 are formed on the connectors 107. The third seal 400 may be disposed on the vertical edge of the connector 107, for example, the third seal 400 may be clamped on the vertical edge of the connector 107 by a retaining component 800 which may be installed in the vertical edge of the connector 107, so that the housing 201 and the horizontal edge of the connector 107 are abutted against each other to realize sealing. The surface of the housing 201 contacting with the connector 107 has a convex spherical shape, while the vertical edge of the connector 107 to be matched with the housing 201 has a concave spherical shape, which together can seal the mounting opening 101. Locating pins, locating slots and the like can be arranged between the connector 107 and the vertical frame part 105 and between the connector 107 and the horizontal frame part 106, so as to improve the overall strength of the frame 102 and prevent the finished frame 102 from loosening.

In an exemplary embodiment, as shown in FIGS. 1 and 2, the foldable screen further includes a connecting beam 600 connected to the first panel body 100 (on the left side of the left panel body 100) through a transmission gear mechanism 200, so that the first panel body 100 can rotate around the connecting beam 600. A first seal 300 is provided between the connecting beam 600 and the first panel body 100 to provide sealing between the connecting beam 600 and the first panel body 100. Alternatively, a connecting beam 600 can be connected with the last panel body 100 through a transmission gear mechanism.

Figure 7:
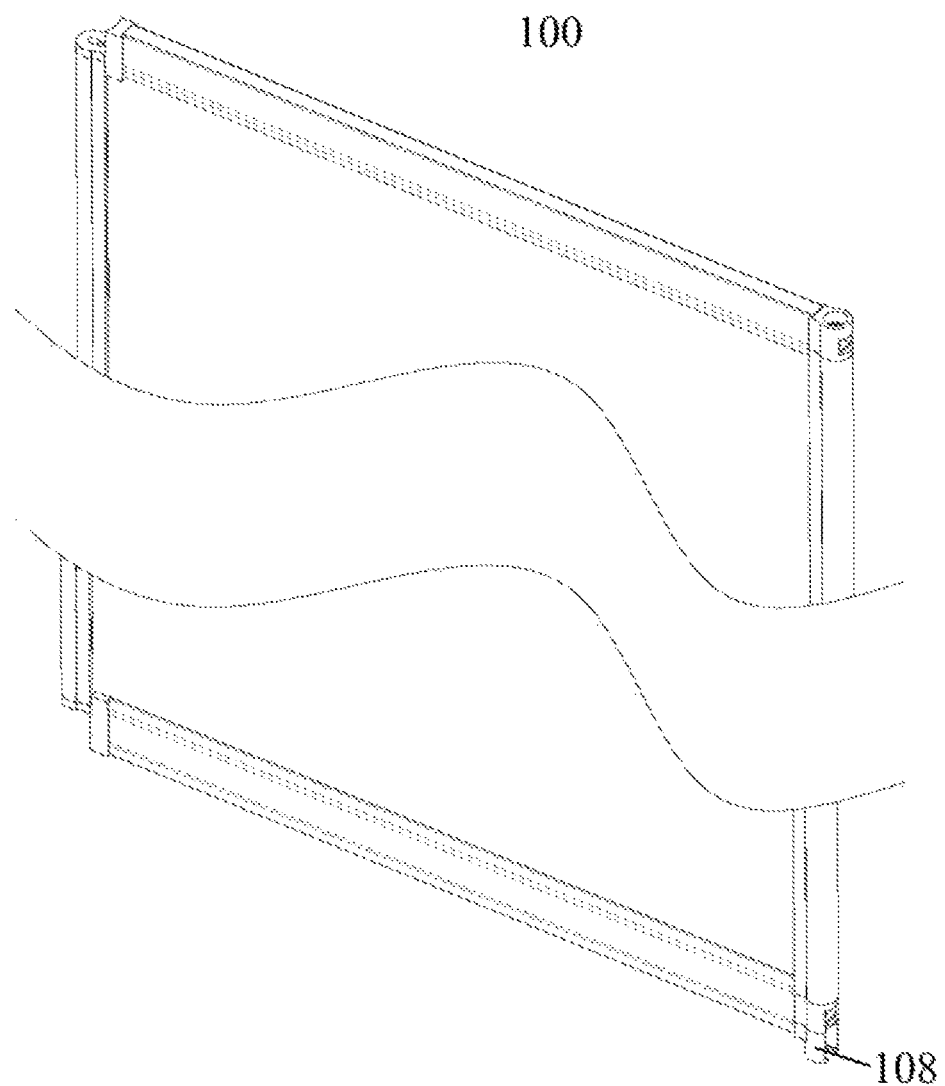
Figure 8:
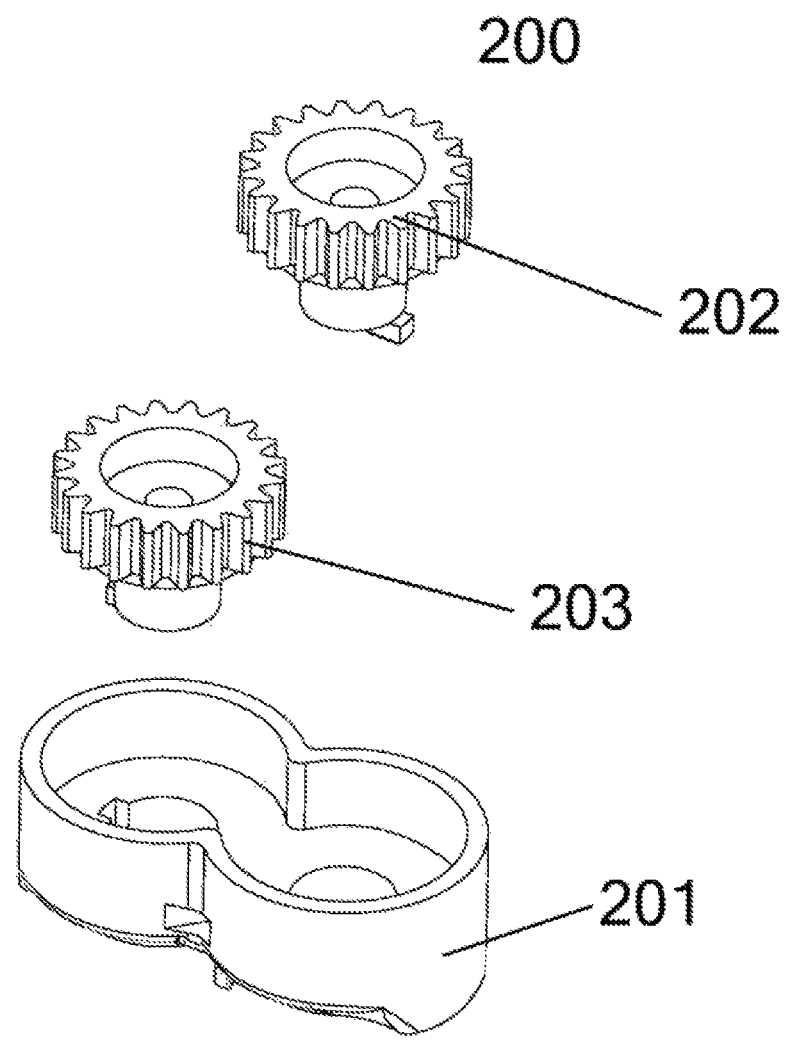
FIG. 8 is a schematic exploded structural view of the transmission gear mechanism in FIG. 1.

In an exemplary embodiment, as shown in FIGS. 1 and 2, the foldable screen further includes a fixing beam 700. The connecting beam 600 is fixed on the fixing beam 700 which in turn is fixed on the wall, so as to realize the installation of the foldable screen on the wall. As shown in FIGS. 3 and 7, a supporting member 108 or the like may be installed at the lower right end of the last panel body 100 (the rightmost panel body). The fixing beam 700 and the connecting beam 600 may both be aluminum alloy beams or the like.

In particular, the number of the plurality of panel bodies 100 may be two, three or four, etc., each can achieve the purpose of the present disclosure and does not depart from the design concept of the present disclosure, and thus falls within the protection scope of the present disclosure. No more details w ill be repeated herein.

Optionally, an outer side surface of an inner end of the housing is provided with a guiding portion.

Optionally, the housing is provided on an outer top surface of the inner end thereof with a w ater storage groove, and the housing is provided on the outer side surface thereof with a w ater outlet which is communicated with the water storage groove.

Optionally, one of an end face of the inner end of the housing and a top wall of the mounting opening is provided with an annular water stop rib, and the other is provided with an annular water stop groove into which the water stop rib is inserted.

Optionally, the housing is a closed housing or an open-ended housing.

Optionally, the foldable screen further includes at least one of the following: a first seal disposed between two adjacent panel bodies; a second seal disposed on the end faces of the plurality of panel bodies along the folding and unfolding directions of the foldable screen with the outer end of the housing abutting on the second seal.

Optionally, the panel body includes: a frame provided with notches at the outer frame corners of the frame, the notches of two adjacent frames facing each other and enclosing to form the mounting opening; and a baffle installed in the frame.

Optionally, the frame includes two vertical frame parts, two horizontal frame parts, and four connectors connecting the two vertical frame parts and the two horizontal frame parts together. The notches are positioned on the connectors.

Optionally, the connector is L-shaped and includes a horizontal edge and a vertical edge, the horizontal edge being connected with a vertical frame part of the frame, and the vertical edge being connected with a horizontal frame part of the frame.

Optionally, the side surface of the housing contacting the connector is a convex spherical surface, and the vertical edge of the connector is a concave spherical surface matched with the convex spherical surface.

Optionally, a third seal between the housing and the connector is provided.

Optionally, a screw hole is provided on the horizontal edge of the connector for connecting the horizontal edge with the vertical frame part of the frame by a screw.

A shower room (not shown in the figures) provided by the present disclosure includes the foldable screen described in any of the above embodiments.

The shower room provided by the present disclosure has all the advantages of the foldable screen described in any of the above embodiments, and will not be described in detail herein.

The foldable screen can be a bathtub foldable door installed on a bathtub.

In summary, the foldable screen of the present disclosure with the meshed first and second gears both positioned in the housing solves the problem that the sealing cannot be realized due to the meshing of the first gear and the second gear. A scaling can be realized between the housing and the panel bodies. The mounting opening can be sealed through the cooperation between the spherical housing and the concave spherical vertical edge of the matching connector, so that waiter is prevented from leaking from the bathroom to the outside of the bathroom at the transmission gear mechanism when the foldable screen is applied to the shower room, meanwhile the foldable screen still has the functions of folding and unfolding.

In the description of the present disclosure, the terms "mount", "couple", "connect", "fix" and the like shall be understood in a broad sense. For example, the term "connect" may be a fixed connection, a detachable connection, or an integral connection; may be a direct connection or an indirect connection through intermediate media. For those of ordinary skill in the art, the specific meanings of the above terms in this disclosure can be understood according to specific context.

In the description of the specification, the description of the terms "one embodiment", "some embodiments", "a specific embodiment" and the like means that a specific feature, structure, material, or characteristic described in connection with the embodiment or example is included in at least one embodiment or example of the present disclosure. In this specification, the schematic representation of the above-mentioned terms does not necessarily refer to the same embodiment or example. Moreover, the specific features, structures, materials, or characteristics described may be combined in any one or more embodiments or examples in a suitable manner.

Although the disclosed embodiments of the present disclosure have been described above, the embodiments are only provided for facilitating understanding of the present disclosure and are not intended to limit the present disclosure. Any person skilled in the art to which this disclosure pertains may make any modifications and changes in the forms and details of embodiments without departing from

What we claim is:

1. A foldable screen, comprising a transmission gear mechanism and a plurality of panel bodies arranged in sequence, wherein end portions of two adjacent sides of two adjacent panel bodies of the plurality of panel bodies enclose to form a mounting opening into which the transmission gear mechanism is installed for realizing folding and unfolding of the plurality of panel bodies;
wherein the transmission gear mechanism comprises:
a housing having a receiving cavity therein, the housing being installed in the mounting opening;
a first gear located in the receiving cavity and installed on one of the two adjacent panel bodies; and
a second gear meshed with the first gear, the second gear being located in the receiving cavity and installed on the other of the two adjacent panel bodies;
wherein the housing is provided on an outer top surface of an inner end thereof with a water storage groove, and the housing is provided on the outer side surface thereof with a water outlet which is communicated with the water storage groove.

2. The foldable screen according to claim 1, wherein an outer side surface of an inner end of the housing is provided with a guiding portion.

3. The foldable screen according to claim 2, wherein any one of the two adjacent panel bodies comprises:
a frame provided with notches at the outer frame corners of the frame, the notches of the frame and an adjacent frame of the frame facing each other and enclosing to form the mounting opening; and
a baffle installed in the frame;
wherein the frame comprises two vertical frame parts, two horizontal frame parts, and four connectors connecting the two vertical frame parts and the two horizontal frame parts together, and the notches are positioned on the connectors.

4. The foldable screen according to claim 1, wherein one of an end face of an inner end of the housing and a top wall of the mounting opening is provided with an annular water stop rib, and the other is provided with an annular water stop groove into which the water stop rib is inserted.

5. The foldable screen according to claim 1, wherein the housing is a closed housing or an open-ended housing.

6. The foldable screen according to claim 1, further comprising at least one of the following:
a first seal disposed between the two adjacent panel bodies;
a second seal disposed on end faces of the plurality of panel bodies along the folding and unfolding directions of the foldable screen with an outer end of the housing abutting on the second seal.

7. The foldable screen according to claim 1, wherein any one of the two adjacent panel bodies comprises:
a frame provided with notches at the outer frame corners of the frame, the notches of the frame and an adjacent frame of the frame facing each other and enclosing to form the mounting opening; and
a baffle installed in the frame;
wherein the frame comprises two vertical frame parts, two horizontal frame parts, and four connectors connecting the two vertical frame parts and the two horizontal frame parts together, and the notches are positioned on the connectors.

8. The foldable screen according to claim 7, wherein each of the connectors is L-shaped and comprises a horizontal edge and a vertical edge, wherein the horizontal edge is connected with a vertical frame part of the frame, and the vertical edge is connected with a horizontal frame part of the frame.

9. The foldable screen according to claim 8, wherein the side surface of the housing contacting the connector is convex to match with the housing, and the vertical edge of the connector is concave to match with the housing.

10. The foldable screen according to claim 9, further comprising a seal between the housing and the connector.

11. The foldable screen according to claim 9, wherein a screw hole is provided on the horizontal edge of the connector for connecting the horizontal edge with the vertical frame part of the frame by a screw.

12. A shower room comprising a foldable screen as claimed in claim 1.

13. A transmission gear mechanism for realizing folding and unfolding of two adjacent panel bodies, wherein end portions of two adjacent sides of the two adjacent panel bodies enclose to form a mounting opening into which the transmission gear mechanism is installed,
wherein the transmission gear mechanism comprises:
a housing having a receiving cavity therein, the housing being installed in the mounting opening;
a first gear located in the receiving cavity and installed on one of the two adjacent panel bodies; and
a second gear meshed with the first gear, the second gear being located in the receiving cavity and installed on the other of the two adjacent panel bodies;
wherein the housing is provided on an outer top surface of an inner end thereof with a water storage groove, and the housing is provided on an outer side surface thereof with a water outlet which is communicated with the water storage groove.

14. The transmission gear mechanism according to claim 13, wherein an outer side surface of an inner end of the housing is provided with a guiding portion.

15. The transmission gear mechanism according to claim 13, wherein one of an end face of an inner end of the housing and a top wall of the mounting opening is provided with an annular water stop rib, and the other is provided with an annular water stop groove into which the water stop rib is inserted.

16. The transmission gear mechanism according to claim 13, wherein the housing is a closed housing or an open-ended housing.

* * * * *